United States Patent
Vajapeyam et al.

(10) Patent No.: US 9,363,038 B2
(45) Date of Patent: Jun. 7, 2016

(54) EVOLVED NODE B CHANNEL QUALITY INDICATOR (CQI) PROCESSING FOR HETEROGENEOUS NETWORKS

(75) Inventors: Madhavan Srinivasan Vajapeyam, San Diego, CA (US); Parag Arun Agashe, San Diego, CA (US); Tingfang Ji, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1155 days.

(21) Appl. No.: 13/085,261

(22) Filed: Apr. 12, 2011

(65) Prior Publication Data

US 2012/0093010 A1    Apr. 19, 2012

Related U.S. Application Data

(60) Provisional application No. 61/323,813, filed on Apr. 13, 2010.

(51) Int. Cl.
*H04L 12/26* (2006.01)
*H04L 1/00* (2006.01)
(Continued)

(52) U.S. Cl.
CPC ............ *H04L 1/0026* (2013.01); *H04W 52/244* (2013.01); *H04W 72/1231* (2013.01); *H04L 1/0003* (2013.01); *H04L 1/0006* (2013.01); *H04L 1/0009* (2013.01); *H04W 84/045* (2013.01)

(58) Field of Classification Search
CPC ............ H04W 52/244; H04W 52/243; H04W 72/082
USPC .......................................................... 370/252
See application file for complete search history.

(56) References Cited

U.S. PATENT DOCUMENTS

| 8,412,222 B2 | 4/2013 | Agrawal et al. |
| 2007/0047498 A1 | 3/2007 | Zhang et al. |

(Continued)

FOREIGN PATENT DOCUMENTS

| EP | 1892854 A1 | 2/2008 |
| JP | 2007028568 A | 2/2007 |

(Continued)

OTHER PUBLICATIONS

International Search Report and Written Opinion—PCT/US2011/032376, ISA/EPO—Jul. 14, 2011.

(Continued)

*Primary Examiner* — Mark Rinehart
*Assistant Examiner* — Matthew Hopkins
(74) *Attorney, Agent, or Firm* — Nerrie M. Zohn

(57) ABSTRACT

Methods and apparatus for processing channel quality information (CQI) and scheduling resources subject to cooperative resource allocation based on the CQI are provided. To convey the CQI for protected/unprotected subframes in a single report, a new vector CQI format may be utilized. Two alternatives for CQI processing this vector format and the advantages of each are described. In the first alternative, a single entry from the CQI vector is selected for processing by a downlink scheduler and/or other media access control (MAC) blocks (e.g., a PHICH, DCI power control, and/or PDCCH scheduler). In the second alternative, the selection from the CQI vector is made on a per-subframe basis, and both the subframe and the selected CQI element are processed by the downlink scheduler and/or the other MAC blocks. In this manner, better scheduling decisions may be made using the CQI vector.

52 Claims, 10 Drawing Sheets

(51) Int. Cl.
*H04W 52/24* (2009.01)
*H04W 72/12* (2009.01)
*H04W 84/04* (2009.01)

(56) References Cited

U.S. PATENT DOCUMENTS

| | | | |
|---|---|---|---|
| 2007/0047512 A1 | 3/2007 | Zhang et al. | |
| 2007/0116012 A1 | 5/2007 | Chang et al. | |
| 2007/0149249 A1* | 6/2007 | Chen et al. | 455/561 |
| 2008/0188234 A1 | 8/2008 | Gorokhov et al. | |
| 2009/0135754 A1* | 5/2009 | Yavuz et al. | 370/311 |
| 2009/0196266 A1* | 8/2009 | Wu et al. | 370/338 |
| 2009/0247181 A1 | 10/2009 | Palanki et al. | |
| 2009/0305741 A1* | 12/2009 | Takeuchi et al. | 455/561 |
| 2010/0056170 A1* | 3/2010 | Lindoff et al. | 455/452.1 |
| 2010/0216403 A1* | 8/2010 | Harrang | 455/41.3 |
| 2010/0227639 A1 | 9/2010 | Kim et al. | |
| 2010/0309876 A1 | 12/2010 | Khandekar et al. | |
| 2011/0142000 A1 | 6/2011 | Han et al. | |
| 2011/0170438 A1 | 7/2011 | Kishiyama et al. | |
| 2011/0217983 A1 | 9/2011 | Morimoto et al. | |
| 2012/0020319 A1 | 1/2012 | Song et al. | |

FOREIGN PATENT DOCUMENTS

| | | |
|---|---|---|
| JP | 2010016494 A | 1/2010 |
| JP | 2010074738 A | 4/2010 |
| JP | 2010537520 A | 12/2010 |
| JP | 2011530942 A | 12/2011 |
| RU | 2323548 C2 | 4/2008 |
| WO | 2005020597 A2 | 3/2005 |
| WO | WO-2008052012 A2 | 5/2008 |
| WO | WO-2009024018 A1 | 2/2009 |
| WO | WO-2009129261 A1 | 10/2009 |
| WO | WO-2010018980 A2 | 2/2010 |

OTHER PUBLICATIONS

LG Electronics: "Extending Rel-8/9 ICIC for heterogeneous network", 3GPP TSG-RAN WG1#60b, R1-102430, Apr. 6, 2010, pp. 1-4.

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

EVOLVED NODE B CHANNEL QUALITY INDICATOR (CQI) PROCESSING FOR HETEROGENEOUS NETWORKS

CROSS-REFERENCE TO RELATED APPLICATIONS

This application claims benefit of U.S. Provisional Patent Application Ser. No. 61/323,813, filed Apr. 13, 2010, which is herein incorporated by reference.

BACKGROUND

I. Field

The present disclosure relates generally to communication and, more specifically, to techniques for supporting communication in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure generally relate to processing channel quality information (CQI) and scheduling resources subject to cooperative resource allocation based on the CQI. To convey the CQI for protected/unprotected subframes in a single report, a new vector CQI format may be utilized. Two alternatives for CQI processing this vector format and the advantages of each are described. In the first alternative, a single entry from the CQI vector is selected for processing by a downlink scheduler and/or other media access control (MAC) blocks (e.g., a PHICH, DCI power control, and/or PDCCH scheduler). In the second alternative, the selection from the CQI vector is made on a per-subframe basis, and both the subframe and the selected CQI element are processed by the downlink scheduler and/or the other MAC blocks.

In an aspect of the disclosure, a method for wireless communications is provided. The method generally includes receiving at least one report for subframes including channel quality information (CQI) for subframes subject to different levels of protection due to a cooperative resource allocation scheme between a serving base station and at least one non-serving base station, and scheduling transmission resources based on the report.

In an aspect of the disclosure, an apparatus for wireless communications is provided. The apparatus generally includes means for receiving at least one report for subframes including CQI for subframes subject to different levels of protection due to a cooperative resource allocation scheme between the apparatus and at least one base station; and means for scheduling transmission resources based on the report. For certain aspects, the apparatus may be a serving base station.

In an aspect of the disclosure, an apparatus for wireless communications is provided. The apparatus generally includes a receiver and a processing system. The receiver is typically adapted to receive at least one report for subframes including CQI for subframes subject to different levels of protection due to a cooperative resource allocation scheme between the apparatus and at least one base station. The processing system is typically configured to schedule transmission resources based on the report.

In an aspect of the disclosure, a computer-program product for wireless communications is provided. The computer-program product generally includes a computer-readable medium having code for receiving at least one report for subframes including CQI for subframes subject to different levels of protection due to a cooperative resource allocation scheme between a serving base station and at least one non-serving base station, and for scheduling transmission resources based on the report.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
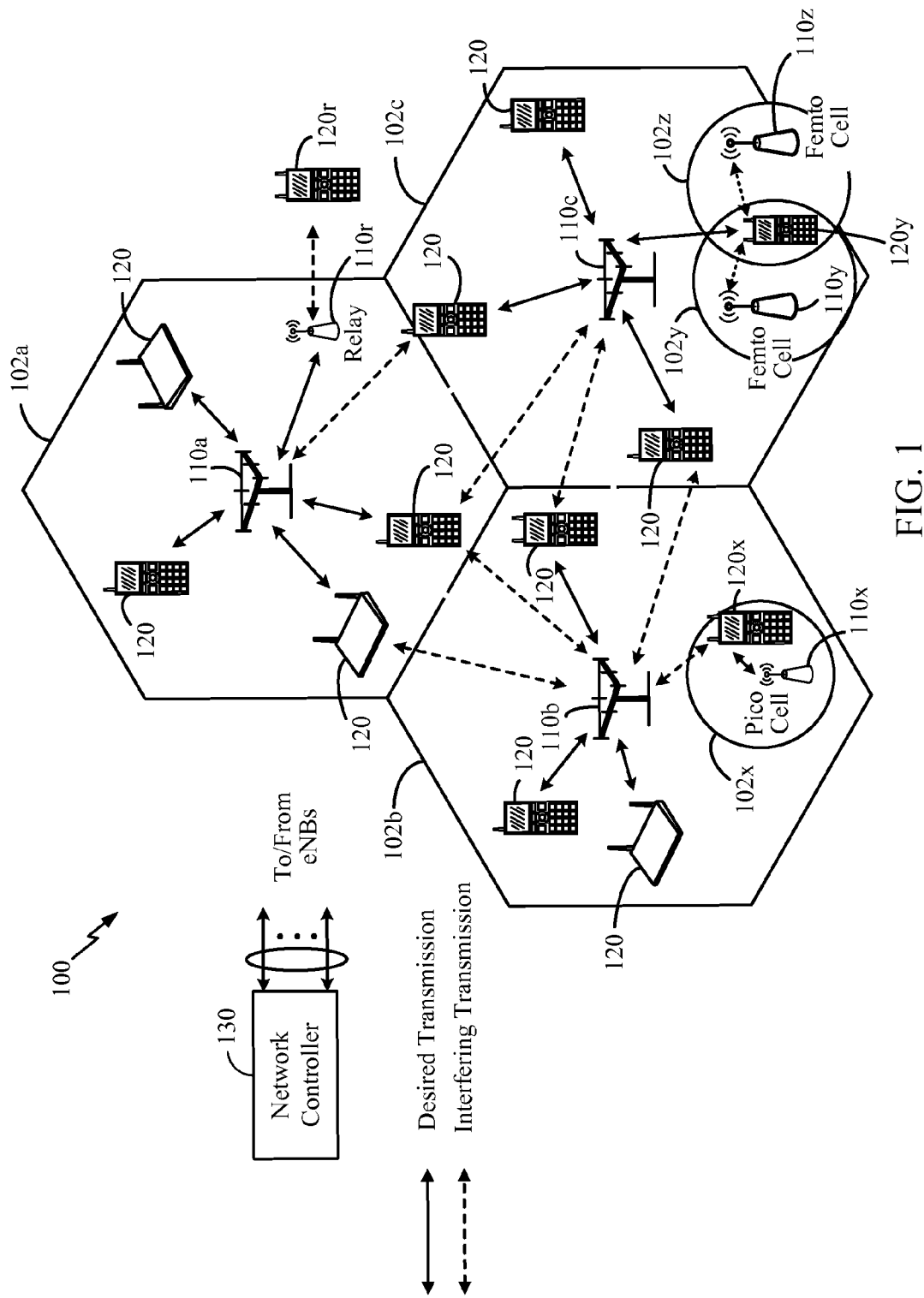
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts), whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. Network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a sub-band may cover 1.08 MHz, and there may be 1, 2, 4, 8, or 16 subbands for system bandwidth of 1.25, 2.5, 5, 10, or 20 MHz, respectively.

Figure 2:
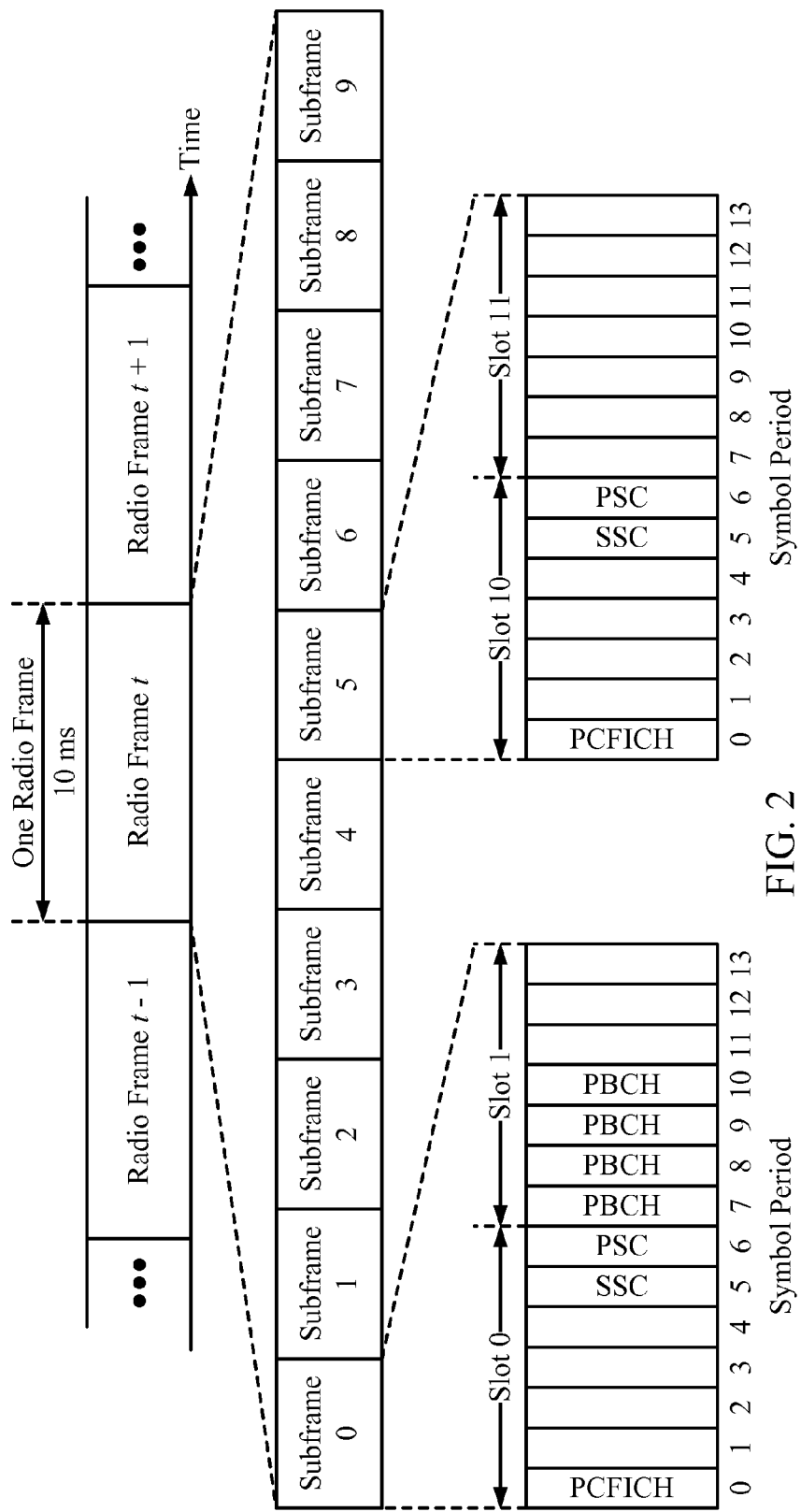
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
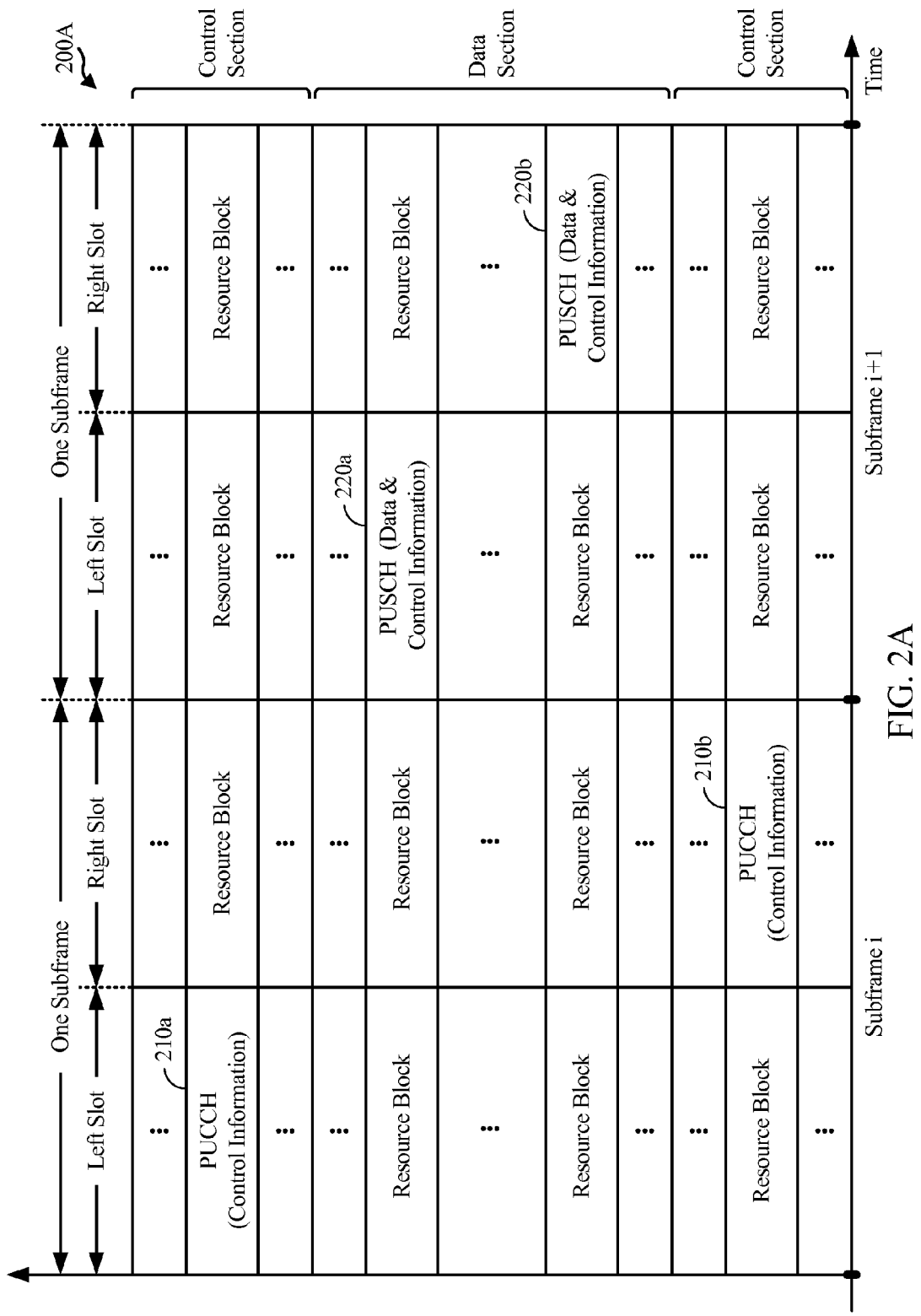
FIG. 2A is a block diagram conceptually illustrating an example of an uplink allocation of resources in accordance with certain aspects of the present disclosure.

FIG. 2A is a block diagram conceptually illustrating an example of an uplink allocation 200A of resources in accordance with certain aspects of the present disclosure, for example, corresponding to an uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210 on the assigned resource blocks in the control section. The UE may transmit only data or both data and control information in a Physical Uplink Shared Channel (PUSCH) 220 on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
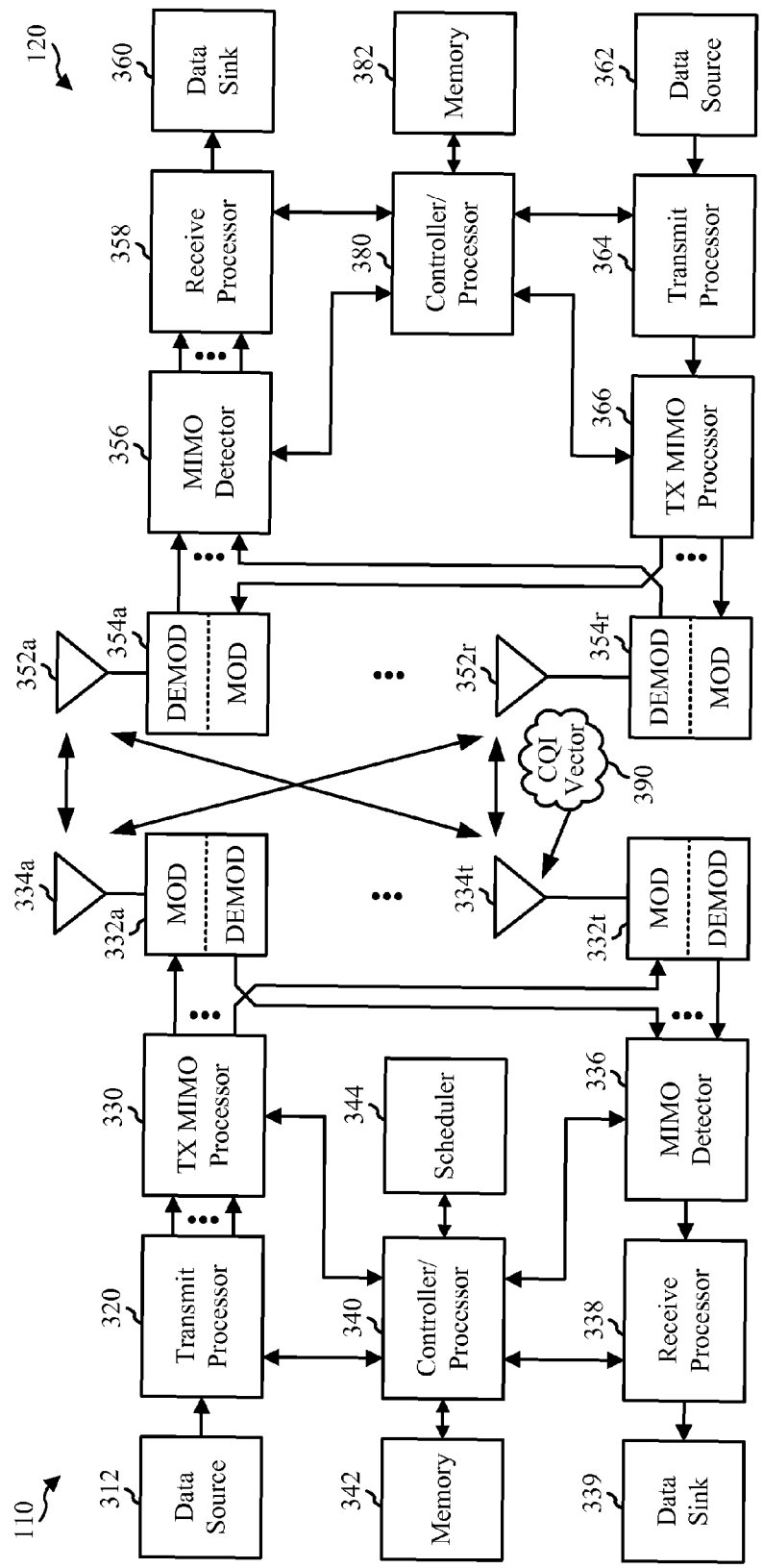
FIG. 3 is a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from the modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. According to certain aspects of the present disclosure, the receive processor 358, the controller/processor 380, and/or the transmit processor 364 of the UE 120 may create a channel quality information (CQI) vector to be transmitted to the eNB 110. The memories 342, 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce/eliminate interference by the interfering cell giving up part of its resources. With this, a UE may be able to access a serving cell even with severe interference by using the resources yielded by the interfering cell.

For example, a femto cell with a closed access mode (i.e., only a member femto UE can access the cell) in an open macro cell's coverage can create a coverage hole for a macro cell. By having a femto cell give up some of its resources, effectively removing interference, the macro UE under the femto cell coverage area may be able to access the UE's serving macro cell by using the resources yielded by a femto cell.

In a radio access system using OFDM such as Evolved Universal Terrestrial Radio Access Network (E-UTRAN), the resources yielded by the interfering cell may be time-based, frequency-based or a combination of both. When the yielded resources are time-based, the interfering cell does not use some of the subframes in the time domain. When the yielded resources (i.e., the coordinated resource partitioning or cooperative resource allocation) are frequency-based, the interfering cell does not use some of the subcarriers in the frequency domain. When the yielded resources are a combination of both frequency and time, the interfering cell does not use certain resources defined by frequency and time.

Figure 4:
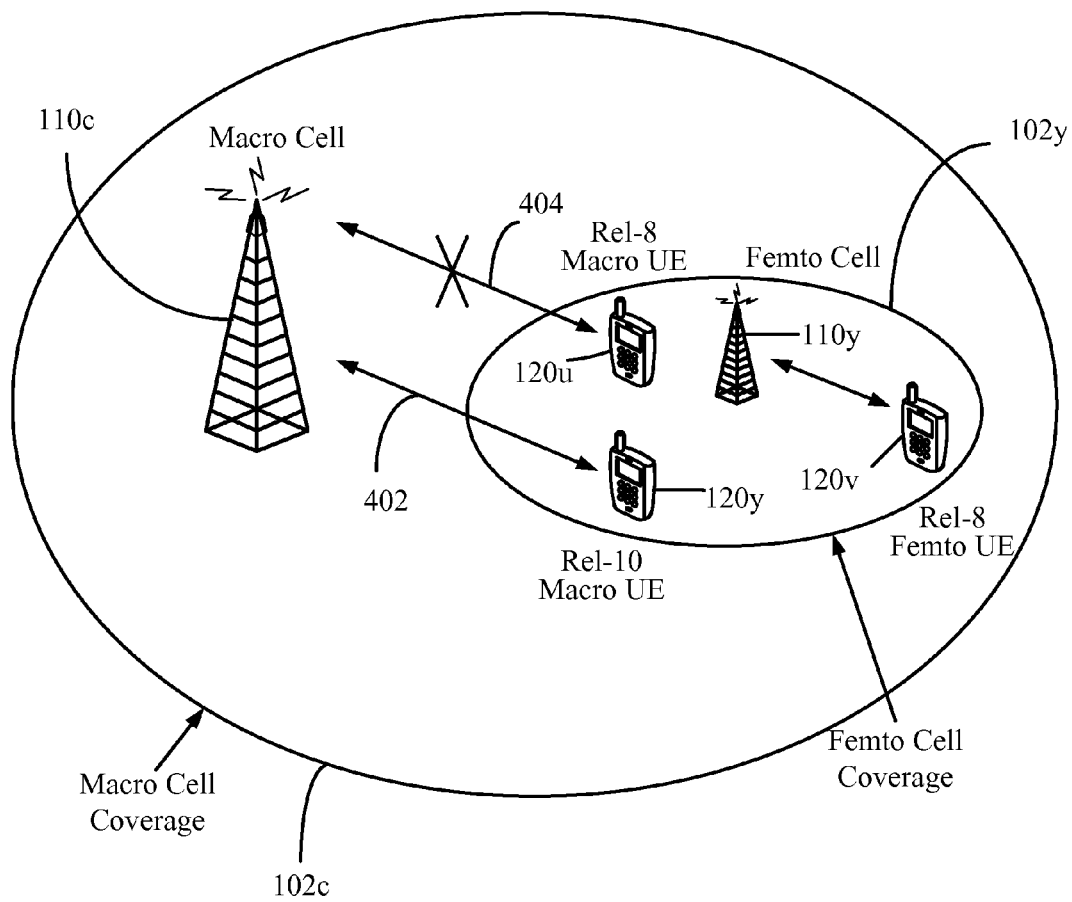
FIG. 4 illustrates an example heterogeneous network in accordance with certain aspects of the present disclosure.

FIG. 4 illustrates an example scenario where eICIC may allow a UE registered with a macro cell (i.e., macro UE 120y) supporting eICIC (e.g., a Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A UE registered with a femto cell, otherwise known as a femto UE 120v, (e.g., a Rel-8 femto UE as shown in FIG. 4) may access the femto cell 110y without any interference problems from the macro cell 110c.

According to certain aspects, networks may support eICIC, where there may be different sets of partitioning information.

A first of these sets may be referred to as Semi-Static Resource Partitioning Information (SRPI). A second of these sets may be referred to as Adaptive Resource Partitioning Information (ARPI). As the name implies, SRPI typically does not change frequently, and SRPI may be sent to a UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from an eNB to a UE), a partitioning pattern may be mapped to a known subframe (e.g., a first subframe of each radio frame that has a system frame number (SFN) value that is a multiple of an integer N, such as 4). Such a mapping may be applied in order to determine resource partitioning information (RPI) for a specific subframe. As an example, a subframe that is subject to coordinated resource partitioning (e.g., yielded by an interfering cell) for the downlink may be identified by an index:

$$Index_{SRPI\_DL} = (SFN*10 + subframe\ number)\ mod\ 8$$

For the uplink, the SRPI mapping may be shifted, for example, by 4 ms. Thus, an example for the uplink may be $$Index_{SRPI\_UL} = (SFN*10 + subframe\ number + 4)\ mod\ 8$$

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned. Details of resource usage negotiation between base stations are not known to the UE.

Another possible set of parameters for SRPI may be the following:
U (Use): this value indicates the subframe has been cleaned up from the dominant interference to be used by this cell (i.e., the main interfering cells do not use this subframe);
N (No Use): this value indicates the subframe shall not be used;
X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g., macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically known only to the base stations and not known to a UE.

Figure 6:
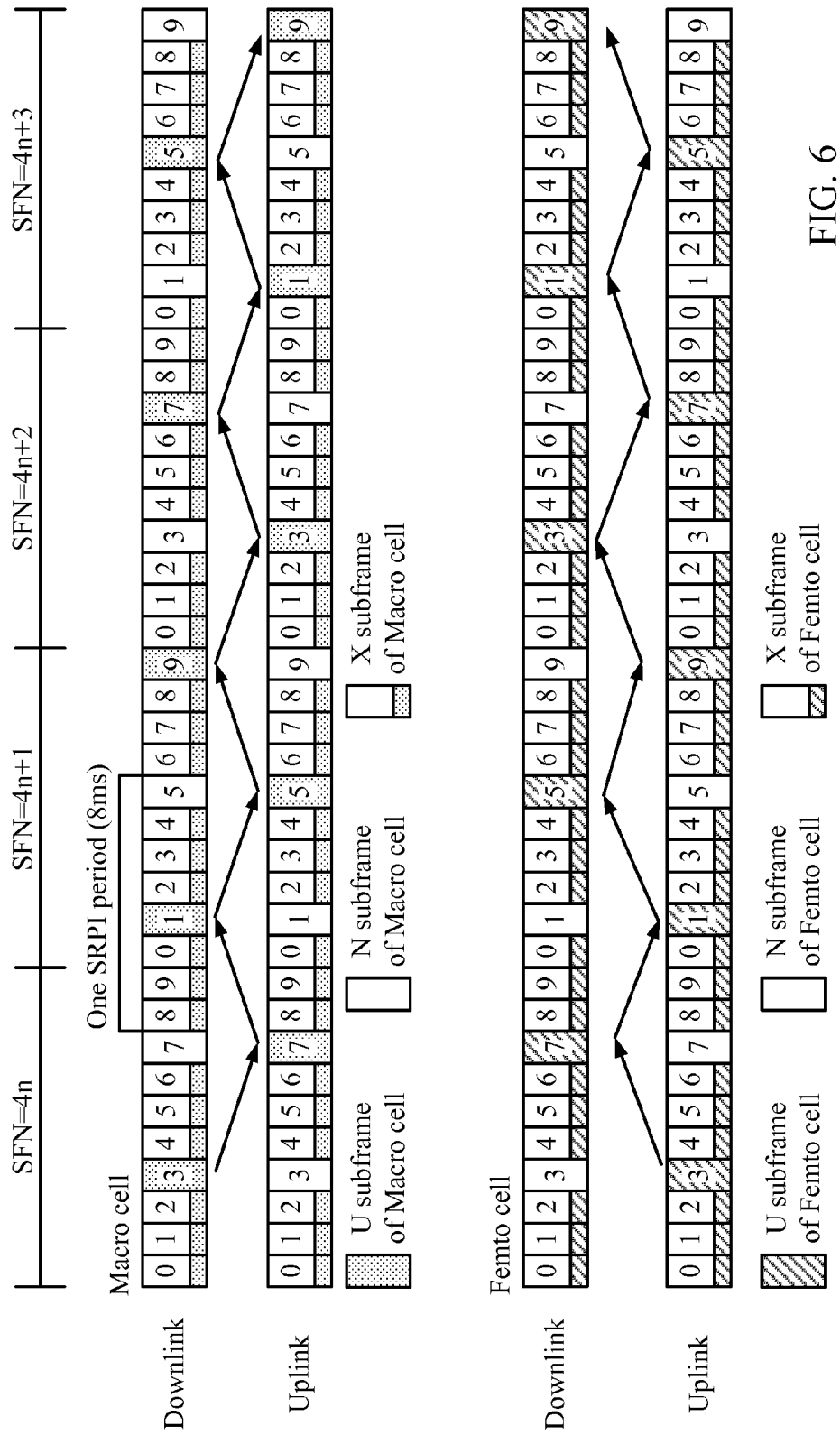
FIG. 6 illustrates example cooperative partitioning of subframes in a heterogeneous network in accordance with certain aspects of the present disclosure.

FIGS. 5 and 6 illustrate examples of SRPI assignment as described above in the scenario with macro and femto cells.

Example CQI Processing for HetNet

As described above, a key mechanism for heterogeneous networks (HetNets) may be partitioning of resources. As an example, a cell may be silent in a particular subframe, allowing users from a neighbor cell that are under its coverage to be served. From the point of view of users experiencing significant interference, time division multiplexing (TDM) partitioning between cells may broadly create two classes of subframes: clean (protected) and unclean (unprotected) subframes. Clean subframes may refer to subframes which do not have interference from the dominant non-serving cell, and unclean subframes may refer to subframes which have interference from a non-serving cell.

According to certain aspects of the present disclosure, a new channel quality indicator (CQI) vector format may allow the capture of channel quality information for clean and unclean subframes in a single report. According to certain aspects, the report may be passed to the scheduler (e.g., of an eNB) which in turn makes a decision on how to use the CQI information to schedule a UE reporting the CQI. The UE may report the CQI by transmitting a CQI vector 390 according to the new format to the eNB, as depicted in FIG. 3. According to certain aspects, various options for CQI processing the CQI vector by the eNB may be provided. These CQI processing options are not limited to situations where CQI vector reporting is used; the CQI information may also be reported with single CQI (i.e., legacy) reports.

Figure 7:
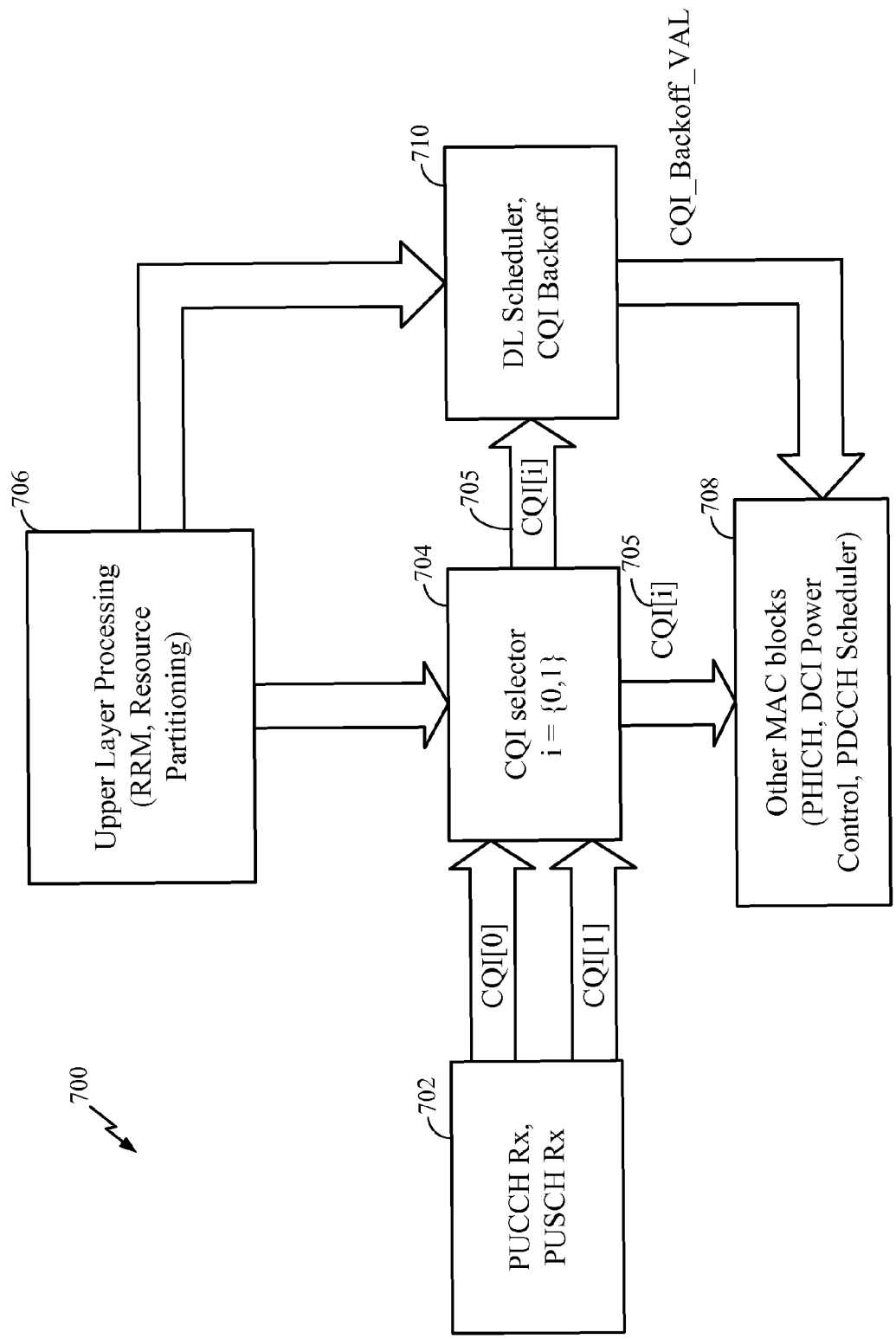
FIG. 7 is a functional block diagram conceptually illustrating a first architecture for channel quality indicator (CQI) processing, in accordance with certain aspects of the present disclosure.

FIG. 7 illustrates a first example architecture 700 for CQI processing. According to certain aspects, vector CQI reports may be received by PUSCH/PUCCH Rx modules 702 and sent to a CQI selector module 704. As illustrated, a single CQI entry may be chosen by the CQI selector module 704. For certain aspects, this choice may be made over a relatively long time scale of hundreds of milliseconds (rate of change in radio resource management (RRM) measurement reports). The CQI selection 705 may then be fed as input to a downlink (DL) scheduler 710 and other blocks 708 (e.g., medium access control (MAC) layer blocks). For certain aspects, the blocks 708 may comprise a PHICH, downlink control information (DCI) Power Control, and/or PDCCH scheduler. The DL scheduler 710, or any other suitable processor, may determine a CQI backoff for a contention window (CW) based on the CQI selection 705. Once determined, the CQI backoff value ($CQI_{13}$ Backoff_VAL) may be provided to the blocks 708, as well. Upper layer processing 706 may provide inputs to and/or control the CQI selector module 704 and the DL scheduler 710. For example, the upper layer processing may comprise radio resource management (RRM) and/or resource partitioning.

An advantage of the architecture 700 shown in FIG. 7 may be that all CQI processing loops may be performed on a single CQI selection (the one provided by the CQI selector module 704). However, this architecture may result in selection of a less-than-ideal CQI for each subframe, based on whether this subframe is a clean or unclean sub frame.

Figure 8:
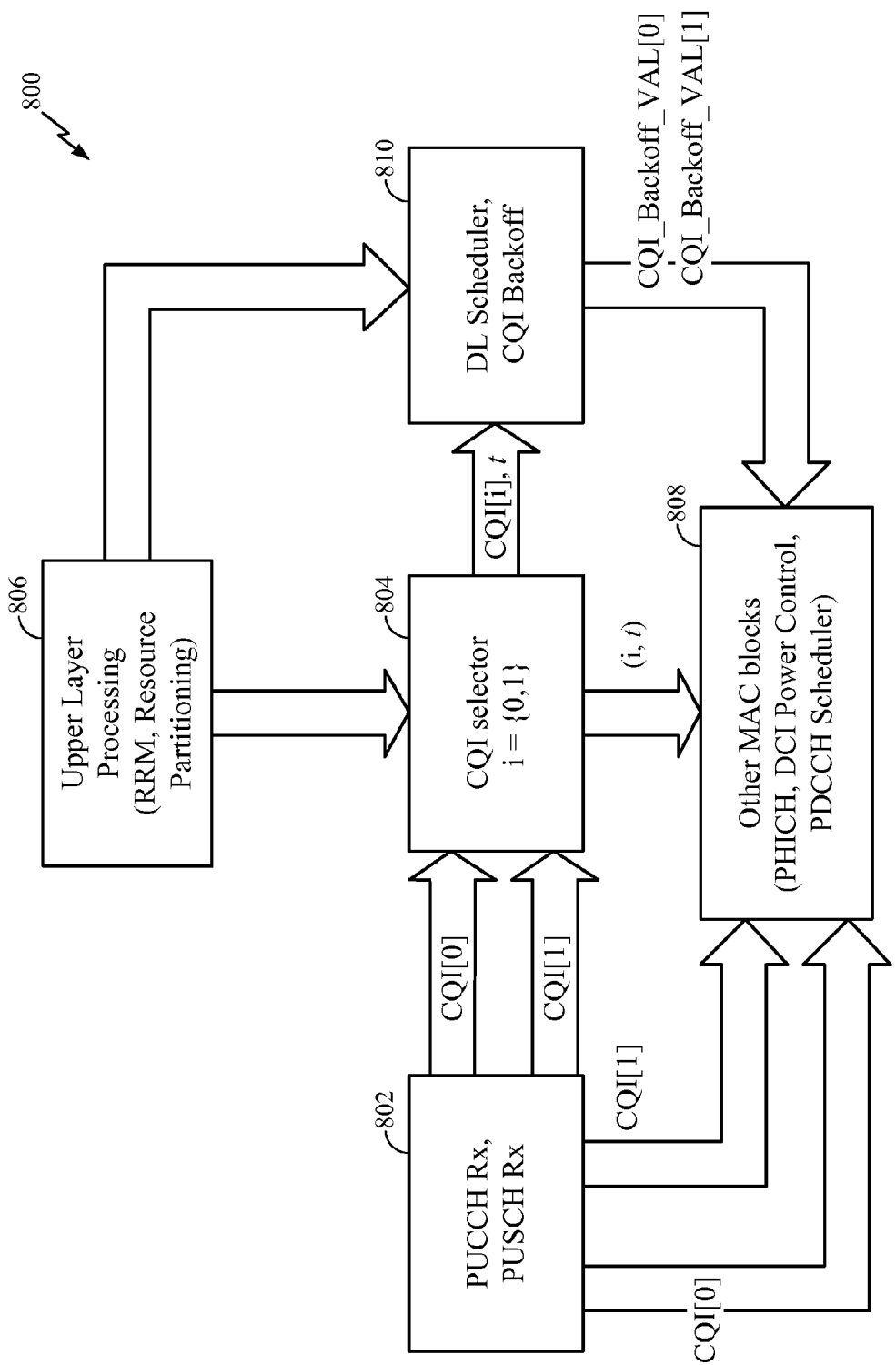
FIG. 8 is a functional block diagram conceptually illustrating a second architecture for CQI processing, in accordance with certain aspects of the present disclosure.

FIG. 8 illustrates a second example architecture 800 for CQI processing. According to certain aspects, vector CQI reports may be received via PUSCH/PUCCH Rx modules 802. At each given subframe t, a CQI selection may be made by the CQI selector module 804, to output first or second CQI output (e.g., corresponding to clean or unclean subframes). Both the CQI selection and subframe t may be propagated to modules in the architecture 800, such as a DL scheduler 810 and other modules 808 (e.g., MAC layer blocks, similar to the blocks 708 in FIG. 7). The scheduler 810, or any other suitable processor, may determine a CQI backoff for a contention window (CW) based on the CQI selection. Once determined, the CQI backoff value (CQI_Backoff_VAL[0] or CQI Backoff VAL[1]) may be provided to the modules 808, as well. Upper layer processing 806 may provide inputs to and/or control the CQI selector module 804 and the scheduler 810.

An advantage of the architecture 800 shown in FIG. 8 may be that it allows each block/module to run individual CQI adjustment loops for each subframe type (clean or unclean). As a result, relatively fast CQI selection may be possible for a given UE, which may result in better scheduling decisions. However, the architecture 800 may involve higher complexity relative to the architecture 700 depicted in FIG. 7, in order to maintain the desired CQI status at each block.

Figure 9:
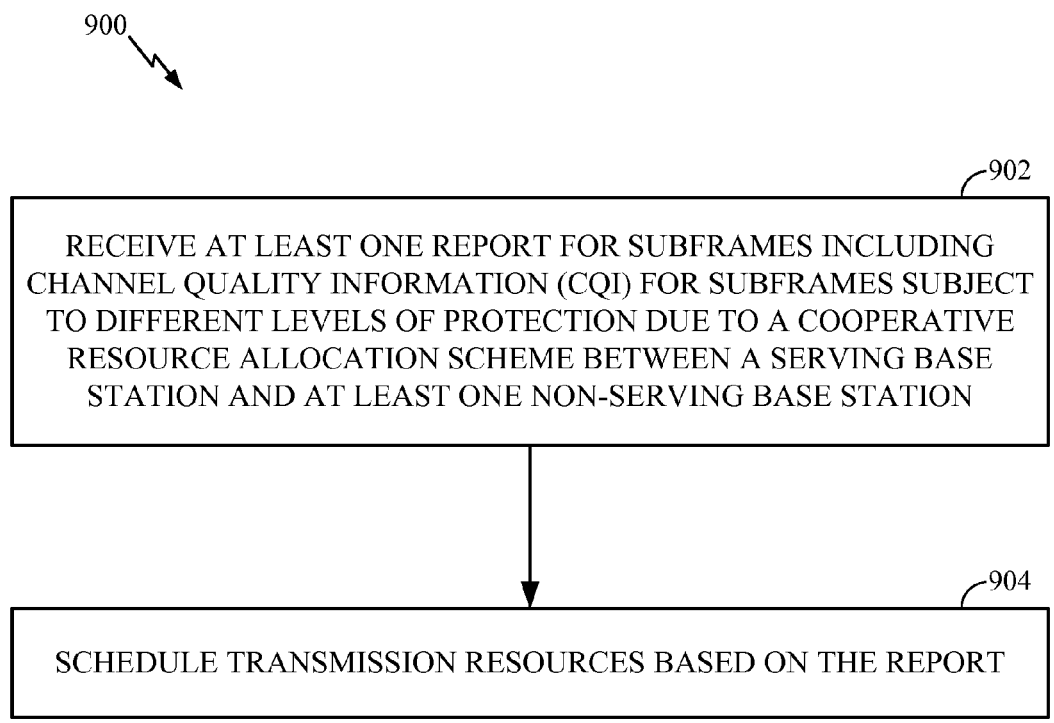
FIG. 9 illustrates example operations for scheduling transmission resources, based on a received CQI report, in accordance with certain aspects of the present disclosure.

FIG. 9 illustrates example operations 900 for scheduling transmission resources based on a received CQI report, in accordance with certain aspects of the present disclosure. The operations 900 may be performed, for example, by an eNB 110 to schedule downlink transmissions to a UE. At 902, an eNB may receive at least one report for subframes including channel quality information (e.g., a CQI, which may be received as a vector) for subframes subject to different levels of protection due to a cooperative resource allocation scheme between a serving base station and at least one non-serving base station. At 904, the eNB (which may be the serving base station) may schedule transmission resources based on the report received at 902.

For certain aspects, the scheduling is for transmission resources subject to the cooperative resource allocation scheme. For certain aspects, the report comprises a vector CQI report. The reports for different subframe types may be sent together in a newly defined report (e.g., a vector CQI report) or separately with legacy reports (i.e., single CQI reports). In the latter case, the eNB may configure the UE such that the single CQI reports alternate between protected and unprotected subframes for certain aspects.

For certain aspects, the scheduling comprises assigning different time and/or frequency resources to respective subframes based on the corresponding levels of protection due to respective subframes. For certain aspects, the scheduling comprises assigning different modulation and coding schemes (MCSs) to respective subframes based on the corresponding levels of protection due to the respective subframes.

For certain aspects, the scheduling is performed based on a first loop corresponding to CQI reported for a first subframe type. For certain aspects, the scheduling is performed based on a second loop corresponding to CQI reported for a second subframe type. For certain aspects, the first subframe type is a protected subframe, and the second subframe type is a non-protected subframe shared between the serving base station and at least one non-serving base station. For certain aspects, the scheduling comprises selecting a CQI entry based on the report.

For certain aspects, the selecting is performed on a per-subframe basis, while for other aspects, the selecting is performed on a per-subframe-type basis (e.g., protected subframe versus non-protected subframe). For certain aspects, the selecting comprises selecting between output of the CQI loop corresponding to protected subframes and output of the CQI loop corresponding to unprotected subframes, as described above.

For certain aspects, the report is received via an uplink channel, such as an uplink control channel (e.g., a PUCCH), an uplink data channel, or a shared uplink channel (i.e., an uplink channel where either or both control information or data traffic may be conveyed, such as a PUSCH). For certain aspects, the subframes subject to different levels of protection comprise one or more subframes that are protected from interference from transmission in other cells and one or more subframes that are not protected from interference from transmissions in other cells. For certain aspects, the scheduling is performed based on filtered or otherwise statistically processed (e.g., an average of) CQI values from multiple reports.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for receiving may comprise a receiver, a demodulator 332, and/or an antenna 334 of the eNB 110 shown in FIG. 3. Means for scheduling may comprise the scheduler 344 of the eNB 110 illustrated in FIG. 3, the scheduler 710, 810 in FIGS. 7 and 8, respectively, or any suitable means for processing, as described below. Means for processing and/or means for determining may comprise a processing system, which may include at least one processor, such as the transmit processor 320 or the controller/processor 340 of the eNB 110 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or encoded as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
receiving at least one report including channel quality information (CQI) for subframes subject to different levels of protection due to a cooperative resource allocation scheme between a serving base station and at least one non-serving base station; and
scheduling transmission resources based on the report;
wherein the subframes subject to different levels of protection comprise one or more subframes that are protected from interference from transmissions in other cells and one or more subframes that are not protected from interference from transmissions in other cells.

2. The method of claim 1, wherein the scheduling is for transmission resources subject to the cooperative resource allocation scheme.

3. The method of claim 1, wherein the report comprises a vector CQI report.

4. The method of claim 1, wherein the scheduling comprises assigning different time or frequency resources to respective subframes based on the corresponding levels of protection due to the respective subframes.

5. The method of claim 1, wherein the scheduling comprises selecting a CQI entry based on the report.

6. The method of claim 5, wherein the selecting is performed on a per-subframe basis.

7. The method of claim 5, wherein the selecting comprises selecting between output corresponding to protected subframes and output corresponding to unprotected subframes.

8. The method of claim 1, wherein the report is received via an uplink control channel.

9. The method of claim 1, wherein the scheduling is performed based on filtered CQI values from multiple reports.

10. A method for wireless communications, comprising:
receiving at least one report including channel quality information (CQI) for subframes subject to different levels of protection due to a cooperative resource allocation scheme between a serving base station and at least one non-serving base station; and
scheduling transmission resources based on the report;
wherein the scheduling comprises assigning different modulation and coding schemes (MCSs) to respective subframes based on the corresponding levels of protection due to the respective subframes.

11. A method for wireless communications, comprising:
receiving at least one report including channel quality information (CQI) for subframes subject to different levels of protection due to a cooperative resource allocation scheme between a serving base station and at least one non-serving base station; and
scheduling transmission resources based on the report;
wherein the scheduling is performed based on a first loop corresponding to CQI reported for a first subframe type.

12. The method of claim 11, wherein the scheduling is performed based on a second loop corresponding to CQI reported for a second subframe type.

13. The method of claim 12, wherein the first subframe type is a protected subframe and the second subframe type is a non-protected subframe shared between the serving base station and the at least one non-serving base station.

14. An apparatus for wireless communications, comprising:
means for receiving at least one report including channel quality information (CQI) for subframes subject to different levels of protection due to a cooperative resource allocation scheme between the apparatus and at least one base station; and
means for scheduling transmission resources based on the report;
wherein the subframes subject to different levels of protection comprise one or more subframes that are protected from interference from transmissions in other cells and one or more subframes that are not protected from interference from transmissions in other cells.

15. The apparatus of claim 14, wherein the means for scheduling is configured to schedule transmission resources subject to the cooperative resource allocation scheme.

16. The apparatus of claim 14, wherein the report comprises a vector CQI report.

17. The apparatus of claim 14, wherein the means for scheduling is configured to assign different time or frequency resources to respective subframes based on the corresponding levels of protection due to the respective subframes.

18. The apparatus of claim 14, wherein the means for scheduling is configured to select a CQI entry based on the report.

19. The apparatus of claim 18, wherein the selecting is performed on a per-subframe basis.

20. The apparatus of claim 18, wherein the selecting comprises selecting between output corresponding to protected subframes and output corresponding to unprotected subframes.

21. The apparatus of claim 14, wherein the report is received via an uplink control channel.

22. The apparatus of claim 14, wherein the means for scheduling is performed based on filtered CQI values from multiple reports.

23. An apparatus for wireless communications, comprising:
means for receiving at least one report including channel quality information (CQI) for subframes subject to different levels of protection due to a cooperative resource allocation scheme between the apparatus and at least one base station; and
means for scheduling transmission resources based on the report;
wherein the means for scheduling is configured to assign different modulation and coding schemes (MCSs) to respective subframes based on the corresponding levels of protection due to the respective subframes.

24. An apparatus for wireless communications, comprising:
means for receiving at least one report including channel quality information (CQI) for subframes subject to different levels of protection due to a cooperative resource allocation scheme between the apparatus and at least one base station; and
means for scheduling transmission resources based on the report;
wherein the means for scheduling is configured to schedule the transmission resources based on a first loop corresponding to CQI reported for a first subframe type.

25. The apparatus of claim 24, wherein the means for scheduling is configured to schedule the transmission resources based on a second loop corresponding to CQI reported for a second subframe type.

26. The apparatus of claim 25, wherein the first subframe type is a protected subframe and the second subframe type is a non-protected subframe shared between the apparatus and the at least one base station.

27. An apparatus for wireless communication, comprising:
a receiver configured to receive at least one report including channel quality information (CQI) for subframes subject to different levels of protection due to a cooperative resource allocation scheme between the apparatus and at least one base station; and
a processing system configured to schedule transmission resources based on the report;
wherein the subframes subject to different levels of protection comprise one or more subframes that are protected from interference from transmissions in other cells and one or more subframes that are not protected from interference from transmissions in other cells.

28. The apparatus of claim 27, wherein the processing system is configured to schedule transmission resources subject to the cooperative resource allocation scheme.

29. The apparatus of claim 27, wherein the report comprises a vector CQI report.

30. The apparatus of claim 27, wherein the processing system is configured to schedule the transmission resources by assigning different time and frequency resources to respective subframes based on the corresponding levels of protection due to the respective subframes.

31. The apparatus of claim 27, wherein the processing system is configured to schedule the transmission resources by selecting a CQI entry based on the report.

32. The apparatus of claim 31, wherein the selecting is performed on a per-subframe basis.

33. The apparatus of claim 31, wherein the selecting comprises selecting between output corresponding to protected subframes and output corresponding to unprotected subframes.

34. The apparatus of claim 27, wherein the report is received via an uplink control channel.

35. The apparatus of claim 27, wherein the processing system is configured to schedule the transmission resources based on filtered CQI values from multiple reports.

36. An apparatus for wireless communication, comprising
a receiver configured to receive at least one report including channel quality information (CQI) for subframes subject to different levels of protection due to a cooperative resource allocation scheme between the apparatus and at least one base station; and
a processing system configured to schedule transmission resources based on the report;
wherein the processing system is configured to schedule the transmission resources by assigning different modulation and coding schemes (MCSs) to respective subframes based on the corresponding levels of protection due to the respective subframes.

37. An apparatus for wireless communication, comprising
a receiver configured to receive at least one report including channel quality information (CQI) for subframes subject to different levels of protection due to a cooperative resource allocation scheme between the apparatus and at least one base station; and
a processing system configured to schedule transmission resources based on the report;
wherein the processing system is configured to schedule the transmission resources based on a first loop corresponding to CQI reported for a first subframe type.

38. The apparatus of claim 37, wherein the processing system is configured to schedule the transmission resources based on a second loop corresponding to CQI reported for a second subframe type.

39. The apparatus of claim 38, wherein the first subframe type is a protected subframe and the second subframe type is a non-protected subframe shared between the apparatus and the at least one base station.

40. A
non-transitory computer-readable medium comprising code for:
receiving at least one report including channel quality information (CQI) for subframes subject to different levels of protection due to a cooperative resource allocation scheme between a serving base station and at least one non-serving base station; and
scheduling transmission resources based on the report;
wherein the subframes subject to different levels of protection comprise one or more subframes that are protected from interference from transmissions in other cells and one or more subframes that are not protected from interference from transmissions in other cells.

41. The computer-program product of claim 40, wherein the scheduling is for transmission resources subject to the cooperative resource allocation scheme.

42. The computer-program product of claim 40, wherein the report comprises a vector CQI report.

43. The computer-program product of claim 40, wherein the scheduling comprises assigning different time or frequency resources to respective subframes based on the corresponding levels of protection due to the respective subframes.

44. The computer-program product of claim 40, wherein the scheduling comprises selecting a CQI entry based on the report.

45. The computer-program product of claim 44, wherein the selecting is performed on a per-subframe basis.

46. The computer-program product of claim 44, wherein the selecting comprises selecting between output corresponding to protected subframes and output corresponding to unprotected subframes.

47. The computer-program product of claim 40, wherein the report is received via an uplink control channel.

48. The computer-program product of claim 40, wherein the scheduling is performed based on filtered CQI values from multiple reports.

49. A non-transitory computer-readable medium comprising code for:

receiving at least one report including channel quality information (CQI) for subframes subject to different levels of protection due to a cooperative resource allocation scheme between a serving base station and at least one non-serving base station; and scheduling transmission resources based on the report;

wherein the scheduling comprises assigning different modulation and coding schemes (MCSs) to respective subframes based on the corresponding levels of protection due to the respective subframes.

50. A non-transitory computer-readable medium comprising code for:

receiving at least one report including channel quality information (CQI) for subframes subject to different levels of protection due to a cooperative resource allocation scheme between a serving base station and at least one non-serving base station; and scheduling transmission resources based on the report;

wherein the scheduling is performed based on a first loop corresponding to CQI reported for a first subframe type.

51. The computer-program product of claim 50, wherein the scheduling is performed based on a second loop corresponding to CQI reported for a second subframe type.

52. The computer-program product of claim 51, wherein the first subframe type is a protected subframe and the second subframe type is a non-protected subframe shared between the serving base station and the at least one non-serving base station.

* * * * *